US006746033B1

(12) United States Patent
McDaniel

(10) Patent No.: US 6,746,033 B1
(45) Date of Patent: Jun. 8, 2004

(54) MOTORIZED VEHICLE STEP ASSEMBLY

(76) Inventor: Patrick K. McDaniel, 101 Erin Rd., Pasco, WA (US) 99301

( * ) Notice: Subject to any disclaimer, the term of this patent is extended or adjusted under 35 U.S.C. 154(b) by 58 days.

(21) Appl. No.: 10/287,233

(22) Filed: Oct. 31, 2002

(51) Int. Cl.[7] .................................................. B60R 3/00
(52) U.S. Cl. .......................... 280/166; 280/163; 182/88
(58) Field of Search .................................. 280/166, 163, 280/169, 164.1, 164.2, 291; 182/88, 91, 95, 96; 296/62, 50

(56) References Cited

U.S. PATENT DOCUMENTS

| 2,049,435 A |   | 8/1936  | Fitch |         |
|-------------|---|---------|-------|---------|
| 3,762,742 A |   | 10/1973 | Bucklen |       |
| 3,887,217 A |   | 6/1975  | Thomas |        |
| 3,955,827 A | * | 5/1976  | Wonigar | 280/166 |
| 4,073,502 A |   | 2/1978  | Frank et al. |   |
| 4,106,790 A | * | 8/1978  | Weiler | 280/166 |
| 4,110,673 A |   | 8/1978  | Nagy et al. |    |
| 4,145,066 A | * | 3/1979  | Shearin | 280/166 |
| 4,198,070 A | * | 4/1980  | Weiler | 280/166 |
| 4,200,303 A |   | 4/1980  | Kelly |         |
| 4,273,217 A | * | 6/1981  | Kajita | 280/166 |
| 4,708,355 A |   | 11/1987 | Tiede |         |
| 5,085,450 A |   | 2/1992  | DeHart, Sr. |    |
| 5,697,626 A |   | 12/1997 | McDaniel et al. | |
| 5,732,996 A | * | 3/1998  | Graffy et al. | 280/166 |
| 6,082,751 A | * | 7/2000  | Hanes et al. | 280/163 |
| 6,158,756 A | * | 12/2000 | Hansen | 280/166 |
| 6,375,207 B1 |  | 4/2002  | Dean et al. |    |
| 6,612,596 B2 | * | 9/2003 | Jeon et al. | 280/166 |

\* cited by examiner

Primary Examiner—Brian L. Johnson
Assistant Examiner—Hau Phan
(74) Attorney, Agent, or Firm—Christensen O'Connor Johnson Kindness PLLC

(57) ABSTRACT

An step assembly (10) is described having a step (12) that moves between down and up positions by pivoting about a longitudinal axis connected to a vehicle chassis (24). One or more link assemblies (22) move the step between these positions. A support bracket (20) connects to the chassis and pivotally supports the step. The link assembly includes a first link (32) having one end fixedly attached to a drive shaft (14) in a radial manner and another end rotatably connected to a second link (34). The connection between the first and second links is located outward of the pivotal connection between the step and the support bracket. In one embodiment, in the up position, the point of rotation between the first and second links is located outward of the drive shaft axis of rotation. A stop is available to limit further rotational travel by the first link.

17 Claims, 3 Drawing Sheets

MOTORIZED VEHICLE STEP ASSEMBLY

FIELD OF THE INVENTION

The present invention relates to steps for overland vehicles, and more specifically to movable steps utilizing a motor to extend and retract the steps during use.

BACKGROUND OF THE INVENTION

Extendable vehicle steps and running boards are commonly used and come in a variety of shapes and sizes. These devices generally include a step or footrest surface that may be moved between a retracted position and an extended operational position to assist passengers entering or exiting the vehicle. For example, U.S. Pat. Nos. 3,762,742 and 4,708,366 both describe a step affixed to an arm having a proximal end rotatably connected to the vehicle. The step rotates about a single axis in going between its retracted and extended positions. U.S. Pat. Nos. 3,887,217; 4,073,502; 4,110,673; and 6,375,207 describe vehicle steps having complicated extension assemblies. Each assembly includes parallel links that rotate a lateral step inward and outward in going between retracted and extended positions.

While prior art devices provide adequate functionality, many of them do not adequately secure the step in the retracted position. This can result in the step inadvertently extending during travel, especially when traveling off-road or on a bumpy surface. Thus, a need exists for a vehicle step that will not easily move from its retracted position unless purposefully commanded to do so. Ideally, the assembly should not be complicated or require components that are difficult to machine, manufacture, or assemble. The present invention is directed to fulfilling these needs and others, as described below.

SUMMARY OF THE INVENTION

In accordance with the teachings of the present invention, a step assembly is described for use with a vehicle chassis. The assembly includes a step, one or more support brackets, one or more link assemblies, a motor, and drive shaft. The support bracket is fastened to the vehicle chassis. The step has at least one support arm that is pivotally connected to the support bracket. The axis of rotation of the arm to the bracket is about a longitudinal first axis. The motor and drive shaft are also supported by the support bracket, with the drive shaft capable of axial rotation. The drive shaft rotation is thus parallel to the pivot axis of the support arm and support bracket. The link assembly includes a first link having a proximal end, fixedly attached to the drive shaft in a radial manner, and a distal end. The link assembly further includes a second link with a proximal end rotatably connected to the first link distal end and a distal end rotatably connected to the support arm at a location outward of the first axis.

During use, the step has a raised, or up, position in which the first and second links are located generally adjacent one another in an upright orientation. The step further includes a down, or lowered, position in which the first and second links are located generally in line with one another in an upright orientation. The first link is made to rotate by rotation of the drive shaft about its longitudinal axis. In one embodiment, the distal end of the first link rotates inward and upward when initiating movement of the step from the down position to the up position, and in a reverse manner when moving the step from the up position to the down position.

In accordance with other aspects of this invention, in the down position, the point of rotation between the first and second links is located laterally outward of the drive shaft's axis of rotation. In one embodiment, the support bracket includes a stop that extends outwardly from the bracket. In the up position, the first link abuts the stop.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
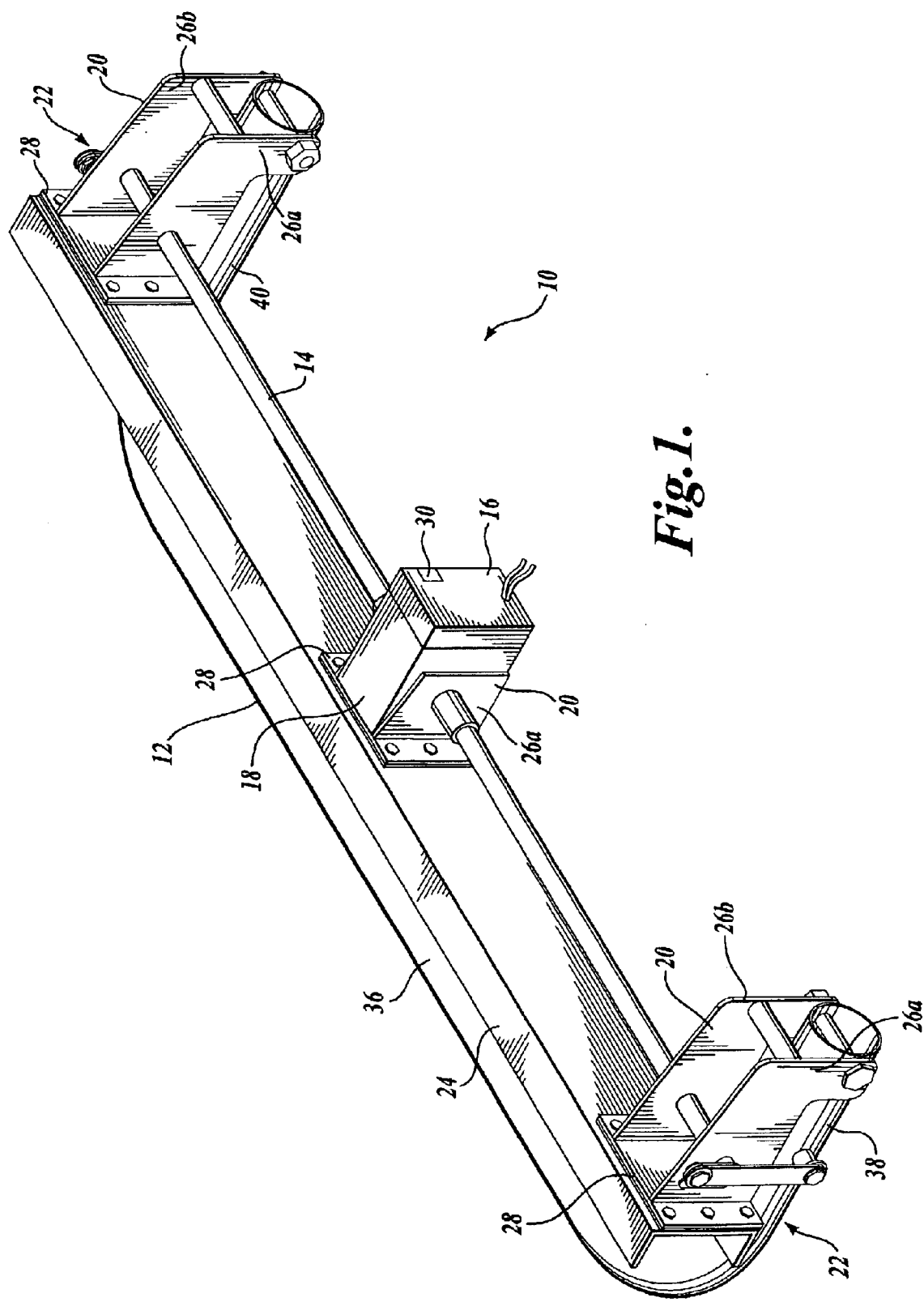
FIG. 1 is a perspective view of one embodiment of the present invention, as shown in an up, or raised, position.
Figure 2:
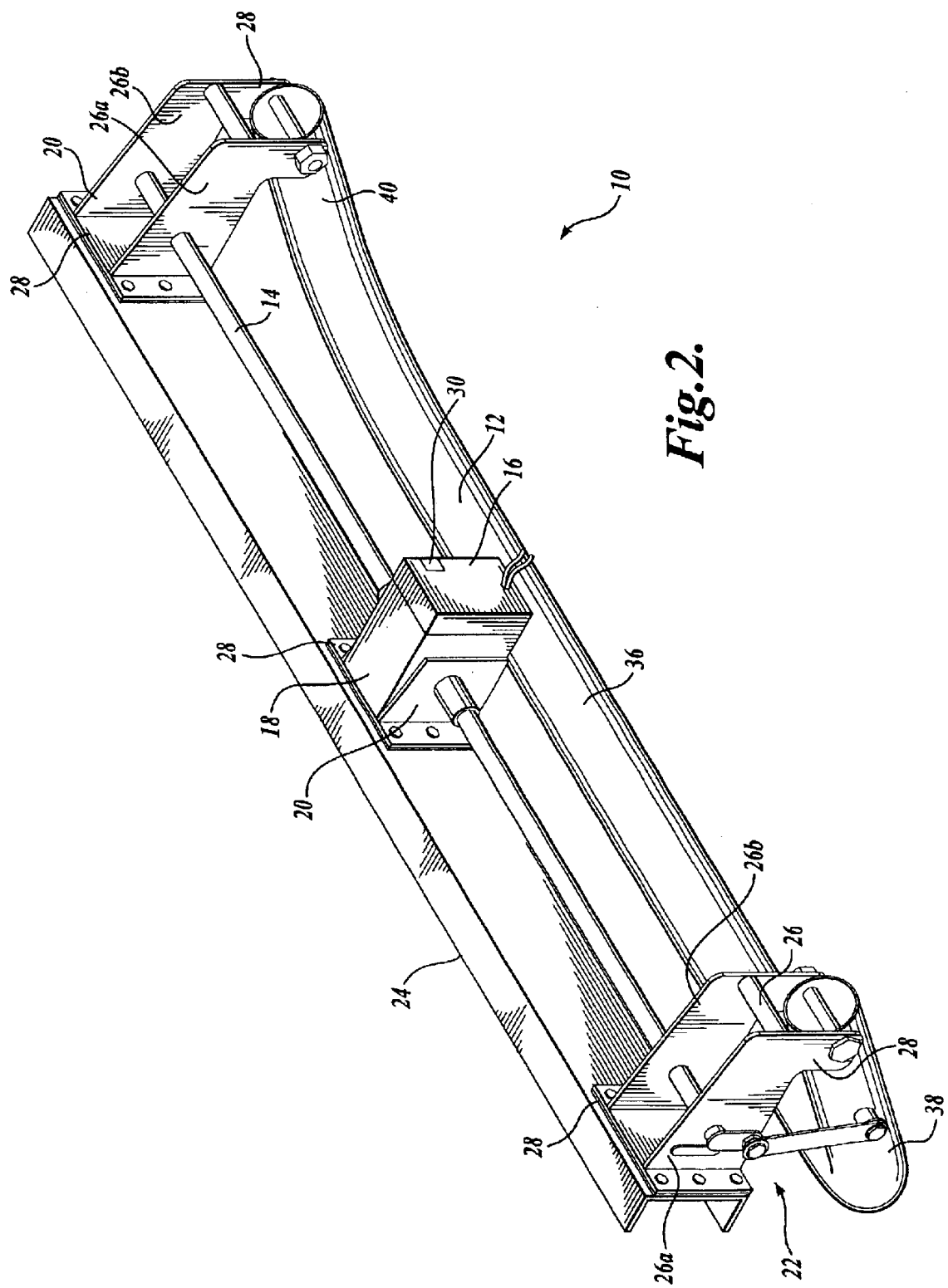
FIG. 2 is a perspective view of the embodiment of FIG. 1, shown in a down, or lowered, position.

Referring to FIG. 1, the present invention is a step assembly 10 for use on the underside of a vehicle. The step assembly includes a foot step 12, a drive shaft 14, an electronic control unit 16, an electric motor 18, various support brackets 20, and one or more two-link pivot assemblies 22. Upon application of electric power to the control unit, e.g., from a vehicle battery, the motor is made to rotate the shaft about its longitudinal axis. Doing so causes the step bar to rotate in a motion described by the pivot assemblies.

In more detail and still referring to FIG. 1, the various support brackets are attached to a vehicle chassis 24. In the embodiment shown, three support brackets 20 hold the middle and each end of the drive shaft 14 along the underside of the vehicle, in a longitudinal orientation. Each support bracket includes a pair of parallel upright flanges 26a, 26b extending rearwardly from an upright front plate 28. As assembled, the front plate 28 is fastened to the chassis 24. The support bracket 20 also includes one or more inner flanges 28 that extend downwardly from the parallel upright flanges 26a, 26b. The inner flange may be omitted for those brackets that do not connect directly with the step. The drive shaft 14 extends longitudinally through each support bracket 20.

The electric motor 18 is operationally connected to the drive shaft 14, either in the middle of the drive shaft (as shown) or at one of the drive shaft's ends. The electronic control unit 16 controls the operation of the electric motor 18 and may be located where convenient. In one embodiment, the electronic control unit 16 includes software capable of altering the performance characteristics of the step, e.g., by increasing or decreasing the speed of the foot step's rotation, by disallowing extension of the bar under certain circumstances, etc. In one embodiment, the electronic control unit includes a current sensor 30. Upon triggering the sensor 30, the electronic control unit 16 stops movement of the step 12. This is a safety feature to avoid movement of the step when it is experiencing a load, e.g., when someone is standing on it, when something is caught between the step and the vehicle, etc.

Figure 3:
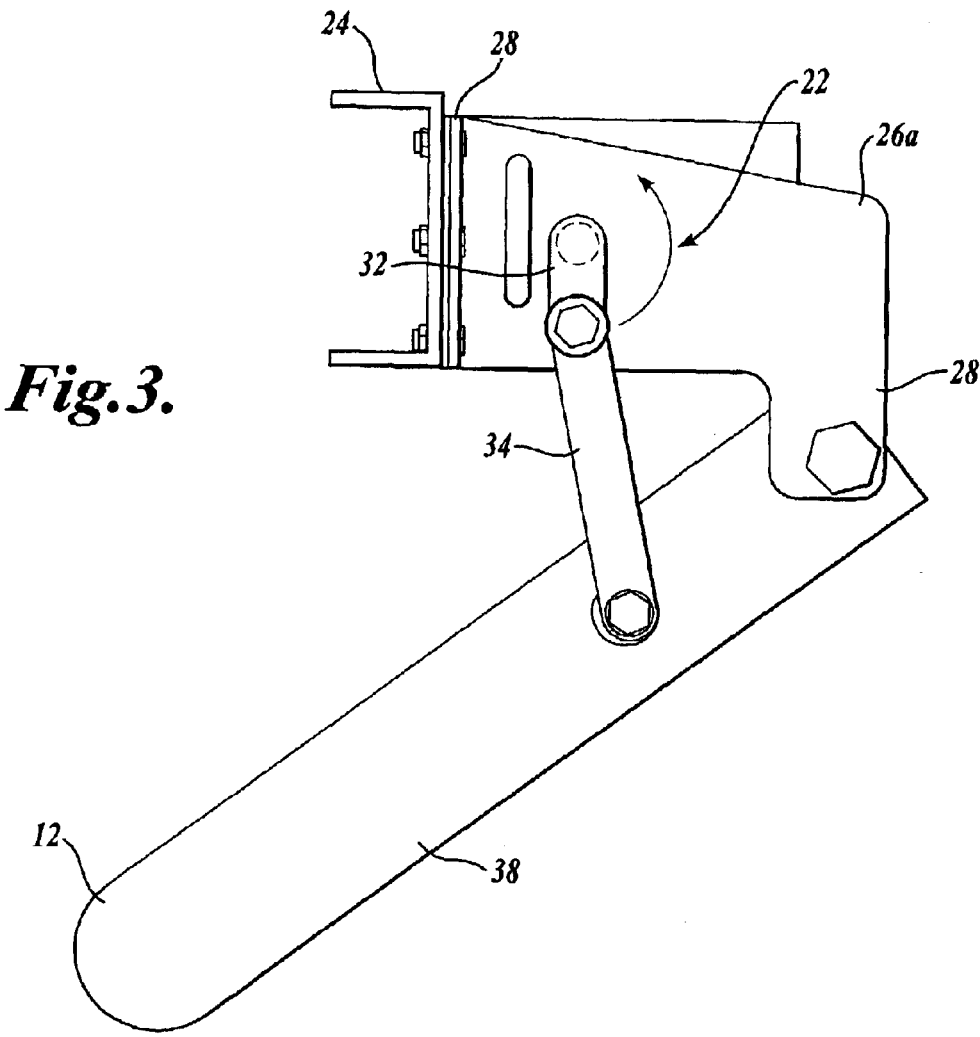
FIG. 3 is a side view of the embodiment of FIG. 2.
Figure 4:
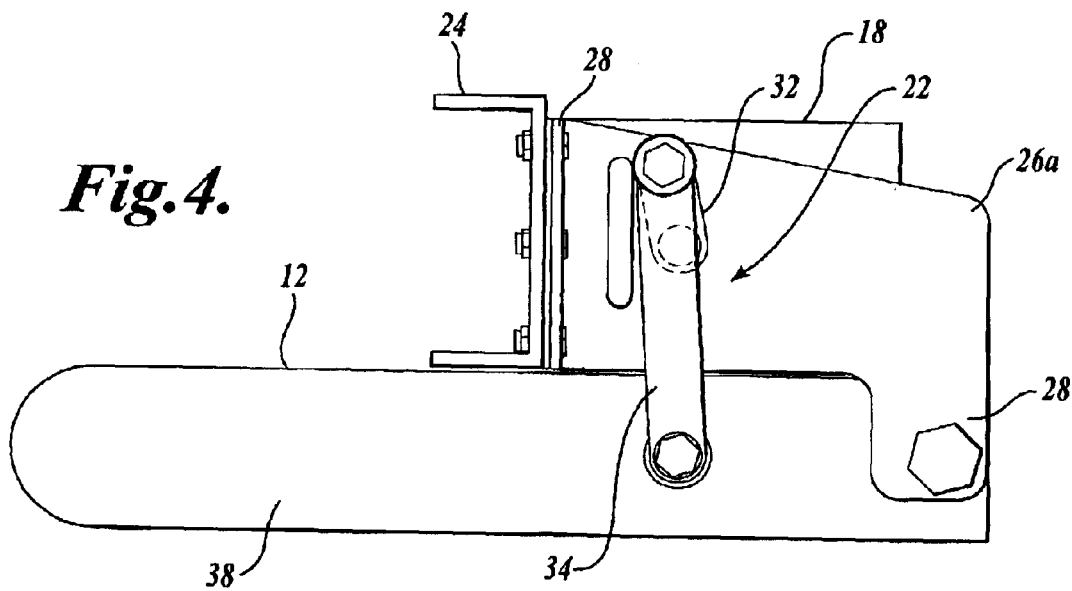
FIG. 4 is a side view of the embodiment of FIG. 1.

Referring to FIGS. 3 and 4, each two-link pivot assembly 22 includes a first link 32 having a proximal end that is fixedly attached to one end of the drive shaft and having a distal end rotatably attached to a proximal end of a second link 34. A distal end of the second link is rotatably attached to the foot step, as described below. The first link 32 is smaller than the second link 34. Both first and second links are positioned in the same plane and both rotate about axes that are parallel to the shaft's axis of rotation.

Referring back to FIG. 1, the foot step is a tube having a longitudinal member 36 and a pair of support arms 38, 40 extending orthogonally inwardly from each end of the longitudinal member 36. This type of step is sometimes referred to in the industry as a "nurf" bar. As will be appreciated by those skilled in the art, other shapes and sizes may be used. In an up, or raised, position, the bar is essentially horizontal. The distal ends of the support arms are rotatably attached to the inner flanges 28 of the end brackets 20. Further, the support arms are rotatably attached to the second link 34 of each two-link pivot assembly. As shown best in FIGS. 3 and 4, the distal ends of the second links 34 are pivotally connected to the support arms 28 at locations outward of the support arm connections to the brackets 20.

During use and referring to FIGS. 3 and 4, the device has two stable positions. In the up, or raised, position, the bar is essentially horizontal and is near the underside of the vehicle. See FIG. 4. The first and second links are generally vertically aligned and adjacent one another. In one embodiment, the first link is made to rotate beyond the overcenter position point, i.e., the pivot point at the connection between the first and second links is located outward of the pivot point of the drive shaft and first link. A stop is provided on the support bracket upon which the first link may rest. In this arrangement, the center of gravity for the assembly is thereby located outward of the overcenter position and outward of the pivot point between the first and second links. This locks the assembly in place and thereby allows it to continually maintain its raised stance, even when the vehicle is traveling over bumpy surfaces.

In a down, or lowered, position, the bar is located below the underside of the vehicle. See FIG. 3. In one embodiment, the bar is located approximately 1 foot below the vehicle. The first and second links are generally vertically aligned, though no longer adjacent, one another.

To use, the operator either manually triggers the device (via the electronic control unit) or the device may be made to trigger automatically (e.g., when the user opens the vehicle door). If started in a down position, the motor rotates the drive shaft, which in turn causes the first links to rotate inward. See FIG. 4, in which the first link moves in a clockwise direction. This causes the proximal end of the second link to move upward, thus, in the process rotating the foot step's transverse member about its attachment to the bracket and lifting the foot step upward. To move to the down position, the motor rotates the drive shaft in an opposite direction (counterclockwise in FIG. 3), which in turn causes the first link, second link, and foot step to move in a reverse manner.

While the preferred embodiment of the invention has been illustrated and described, it will be appreciated that various changes can be made therein without departing from the spirit and scope of the invention. For example, depending on the anticipated loads, the present invention may be made with a single link assembly, or with more than two link assemblies. Further, depending on the application and the space available, the distal end of the first links could be made to rotate in a counterclockwise direction when initiating movement of the foot step from the down to the up position.

The embodiments of the invention in which an exclusive property or privilege is claimed are defined as follows:

1. A step assembly for use with a vehicle chassis, the assembly comprising:
   (a) a step having at least one support arm;
   (b) at least one support bracket adapted to attach to the vehicle chassis; the at least one support arm being pivotally connected to the support bracket about a first axis;
   (c) a motor and drive shaft operationally connected to the motor, the drive shaft capable of axial rotation; the drive shaft being supported by the at least one support bracket whereby the axis of rotation of the drive shaft is at a location outward of the location of the first axis and oriented such that its axis of rotation is parallel to the first axis; and
   (d) at least one link assembly including a first link having a proximal end fixedly attached to the drive shaft in a radial manner and a distal end; the link assembly further including a second link with a proximal end rotatably connected to the first link distal end and a distal end rotatably connected to the at least one support arm at a location outward of the first axis;
   wherein the step includes an up position in which the first and second links are located generally adjacent one another in an upright orientation and a down position in which the first and second links arc located generally in line with one another in an upright orientation; the first link being made to rotate by rotation of the drive shaft about its longitudinal axis.

2. The step assembly according to claim 1, wherein the first link rotates inward and upward in going from its down position to its up position and in a reverse manner when going from its up position to its down position.

3. The step assembly according to claim 2, wherein, in the up position, the point of rotation between the first and second links is located outward of the drive shaft axis of rotation.

4. The step assembly according to claim 3, wherein, in the up position, the point of rotation between the first and second links is located outward of the point of rotation of the distal end of the second link with the at least one support arm.

5. The step assembly according to claim 2, wherein the support bracket includes a stop extending outwardly from the bracket; and wherein, in the up position, at least one of the first link and second links abuts the stop.

6. The step assembly according to claim 5, wherein the first link abuts the stop.

7. The step assembly according to claim 1, further comprising an electronic control unit, the motor being an electric motor controllable by the unit.

8. The step assembly according to claim 1, wherein the electronic control unit includes a sensor; wherein triggering the sensor causes the electronic control unit to stop movement of the assembly.

9. The step assembly according to claim 1, wherein the step has a U-shaped form.

10. The step assembly according to claim 1, wherein the at least one support arm includes at least two support arms.

11. The step assembly according to claim 10, wherein the at least one link assembly includes at least two link assemblies connected to the at least two support arms.

12. The step assembly according to claim 11, wherein the step includes opposed ends with a first support arm located at one end of the step and a second support arm located at the other end of the step, the at least two link assemblies including corresponding first and second link assemblies.

13. A step assembly for use with a vehicle chassis, the assembly comprising:
   (a) a U-shaped step having first and second transverse support arms extending from ends of a longitudinal member;
   (b) first and second support brackets adapted to attach to the vehicle chassis; each transverse support arm being pivotally connected to the corresponding support bracket about a first axis;
   (c) a motor and drive shaft operationally connected to the motor, the drive shaft capable of axial rotation and extending between the first and second support brackets at locations outward of the first axis and oriented such that its axis of rotation is parallel to the first axis; and
   (d) first and second link assemblies, each including a first link having a proximal end fixedly attached to one end of the drive shaft in a radial manner and a distal end; each link assembly further including a second link with a proximal end rotatably connected to the first link distal end and a distal end rotatably connected to the transverse support arm at a location outward of the first axis;
   wherein the step includes an up position in which the first and second links of each link assembly are located generally adjacent one another in an upright orientation and a down position in which the first and second links of each link assembly are located generally in line with one another in an upright orientation; the first link being made to rotate by rotation of the drive shaft about its longitudinal axis.

14. The step assembly according to claim 13, wherein the support bracket includes a stop extending outwardly from the bracket; and wherein, in the up position, the first link abuts the stop.

15. The step assembly according to claim 13, wherein the first link rotates inward and upward in going from its down position to its up position and in a reverse manner when going from its up position to its down position.

16. The step assembly according to claim 15, wherein, in the up position, the point of rotation between the first and second links is located outward of the drive shaft axis of rotation.

17. The step assembly according to claim 16, wherein, in the up position, the point of rotation between the first and second links is located outward of the point of rotation of the distal end of the second link with the transverse support arm.

* * * * *

UNITED STATES PATENT AND TRADEMARK OFFICE
CERTIFICATE OF CORRECTION

| | |
|---|---|
| PATENT NO. | : 6,746,033 B1 |
| APPLICATION NO. | : 10/287233 |
| DATED | : June 8, 2004 |
| INVENTOR(S) | : P.K. McDaniel |

Page 1 of 1

It is certified that error appears in the above-identified patent and that said Letters Patent is hereby corrected as shown below:

COLUMN   LINE

4                                  "arc" should read --are--
(Claim 1,   line 26)

Signed and Sealed this

Seventeenth Day of October, 2006

JON W. DUDAS
*Director of the United States Patent and Trademark Office*